(12) United States Patent
Shang et al.

(10) Patent No.: US 9,958,689 B2
(45) Date of Patent: May 1, 2018

(54) LIGHT-GUIDING DEVICE, LIGHT-GUIDING METHOD AND DISPLAY APPARATUS FOR GUIDING LIGHT TRANSMISSION

(71) Applicant: Lenovo (Beijing) Co., Ltd., Beijing (CN)

(72) Inventors: Yanlong Shang, Beijing (CN); Guang Yang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 252 days.

(21) Appl. No.: 14/583,226

(22) Filed: Dec. 26, 2014

(65) Prior Publication Data

US 2015/0370078 A1    Dec. 24, 2015

(30) Foreign Application Priority Data

Jun. 24, 2014   (CN) .......................... 2014 1 0288898

(51) Int. Cl.
*G02F 1/1333*     (2006.01)
*G02B 27/22*      (2018.01)

(52) U.S. Cl.
CPC ............................... *G02B 27/2214* (2013.01)

(58) Field of Classification Search
CPC ........................... G02B 27/22; G02B 27/2214
USPC .................................................. 349/110–111
See application file for complete search history.

(56) References Cited

U.S. PATENT DOCUMENTS

| 9,291,813 B2 | 3/2016 | Steyn |
| 2012/0154455 A1 | 6/2012 | Steyn |
| 2012/0236405 A1* | 9/2012 | Ohyama ............ G02B 27/2214 359/464 |
| 2013/0050609 A1 | 2/2013 | Inoue |
| 2013/0271503 A1 | 10/2013 | Odake |

(Continued)

FOREIGN PATENT DOCUMENTS

| CN | 202057883 U | 11/2011 |
| CN | 202617288 U | 12/2012 |

(Continued)

OTHER PUBLICATIONS

First Office Action dated May 15, 2017 (11 pages including English translation) out of Chinese priority Application No. 201410288898.7.

(Continued)

*Primary Examiner* — Charles Chang
(74) *Attorney, Agent, or Firm* — Brinks Gilson & Lione; G. Peter Nichols (57) ABSTRACT

A light-guiding device includes a first transparent substrate having an incident surface and a transmission surface; a first parallax barrier located on the first transparent substrate and configured to allow a first type of light in the light source to be converged to a first assemblage point and allow a second type of light in the light source to be converged to a second assemblage point, wherein the first parallax barrier includes a plurality of light-shielding units, each of which is produced by using a micro-electro-mechanical system switch, and includes a light-shielding body; an attraction cantilever, connected with the light-shielding body, an attraction and a separation of the attraction cantilever configured to force the light-shielding body to move so as to change transmission of the light in the light source.

17 Claims, 5 Drawing Sheets

(56) References Cited

U.S. PATENT DOCUMENTS

2014/0218670 A1* 8/2014 Nagano ............ G02F 1/133512
                                                                  349/110
2016/0202470 A1    7/2016 Steyn

FOREIGN PATENT DOCUMENTS

| CN | 102955285 | 3/2013 |
| CN | 103380394 | 10/2013 |
| JP | 2014-081416 A | 5/2014 |

OTHER PUBLICATIONS

Office Action and English language translation thereof, in corresponding Chinese Application No. 201410288898.7, dated Feb. 7, 2018, 11 pages.

* cited by examiner

Fig.8 ized glasses.
LIGHT-GUIDING DEVICE, LIGHT-GUIDING METHOD AND DISPLAY APPARATUS FOR GUIDING LIGHT TRANSMISSION This application claims priority to Chinese patent application No. 201410288898.7 filed on Jun. 24, 2014, the entire contents of which are incorporated herein by reference.

The present application relates to the technical field of display, and especially relates to a light-guiding device, a light-guiding method and a display apparatus including the light-guiding device.

BACKGROUND

In general, an image viewed by a viewer's left eye is different from that viewed by his right eye, wherein the image viewed by the left eye is usually referred to as a left-side view or a left-eye image and the image viewed by the right eye is usually referred to as a right-side view or a right-eye image. In current technology trend, three-dimensional (3D) image display apparatus is widely used. Using three-dimensional display as an example, there are Red-Cyan anaglyph glasses, LCD-shutter glasses and micro retarder with polarized glasses.

In addition to the above-mentioned glasses, there are also many 3D display apparatuses, such as two-view 3D liquid crystal display and multi-view 3D liquid crystal display, which can be used to generate a stereo image, and they allow a user to view a three-dimensional image with his naked eyes, referred to as light barrier type naked-eye display technology for short. In the above-mentioned light barrier type naked-eye display technology, some shelters (hereinafter referred to as parallax barriers) made of a liquid crystal material are added into light transmission path, and the parallax barriers shield the light in a part of direction, only allowing the light with a certain angle to be transmitted out, so that the left-eye pixels are merely seen by the left eye, and the right-eye pixels are merely seen by the right eye. Therefore, the viewer can see 3D images by separating left-eye visual images and right-eye visual images. However, because the response speed of the liquid crystal material is relatively slow, the operation temperature is limited and the resolution is low, these in turn lead to the relatively slow response speed, the limited operation temperature and the relatively low resolution of the three dimensional image display apparatus. Therefore, it is desirable to provide an image display technology for increasing the response speed and the resolution of image display and reducing an environmental impact on the image display effect.

SUMMARY

The embodiments of the present application provide a light-guiding device, a light-guiding method and a display apparatus including the light-guiding device for guiding light transmission.

One aspect of the present application provides a light-guiding device for guiding transmission of light in a light source, the light-guiding device including: a first transparent substrate, having an incident surface and a transmission surface; a first parallax barrier, located on the first transparent substrate and configured to allow a first type of light in the light source to be converged to a first assemblage point and allow a second type of light in the light source to be converged to a second assemblage point, wherein, the first parallax barrier includes a plurality of light-shielding units, each of which is produced by using a micro-electro-mechanical system switch, and includes: a light-shielding body; an attraction cantilever, connected with the light-shielding body, an attraction and a separation of the attraction cantilever being capable of forcing the light-shielding body to move so as to change transmission of the light in the light source.

In the above light-guiding device, the attraction cantilever includes: a first electrostatic attraction cantilever, which may include a first cantilever, a first cathode and a first anode, wherein when a voltage is applied to the first cathode and the first anode, the first cantilever attracts, and when no voltage is applied to the first cathode and the first anode, the first cantilever separates.

In the above light-guiding device, the attraction cantilever may further includes a second electrostatic attraction cantilever, which may include a second cantilever, a second cathode and a second anode, wherein, the first electrostatic attraction cantilever and the second electrostatic attraction cantilever are respectively located at two opposite sides connected to the light-shielding body.

In the above light-guiding device, the first parallax barrier is located on the incident surface of the first transparent substrate, and the light-guiding device may further includes: a second parallax barrier, located on the incident surface of the first transparent substrate and configured, in cooperation with the first parallax barrier, to allow the first type of light in the light source to be converged towards a first direction and allow the second type of light in the light source to be converged towards to a second direction, the second parallax barrier including a plurality of light-shielding units.

In the above light-guiding device, the plurality of light-shielding units in the second parallax barrier may be fixedly disposed on the transmission surface of the first transparent substrate.

In the above light-guiding device, each light-shielding unit in the second parallax barrier may include: a light-shielding body; an attraction cantilever, connected with the light-shielding body, an attraction and a separation of the attraction cantilever being capable of forcing the light-shielding body to move so as to change light transmission.

The above light-guiding device may further include: a second transparent substrate; a third parallax barrier, located on the second transparent substrate and configured, in cooperation with the first parallax barrier, to allow the first type of light in the light source to be converged towards a first direction and allow the second type of light in the light source to be converged towards to a second direction, and the third parallax barrier including a plurality of light-shielding units.

In the above light-guiding device, a position of the plurality of light-shielding units and a movement of each light-shielding body in the first parallax barrier may be determined according to at least one of a feature of incoming light, a position of the first assemblage point and a position of the second assemblage point.

Another aspect of the present application provides a display apparatus for displaying image, and may include: a backlight unit for providing a light source needed for image display; a display panel for displaying image by using light of the light source according to image data; any one of the above-described light-guiding devices, located between the backlight unit and the display panel.

Still another aspect of the present application provides a method for guiding transmission of light in a light source, and the method may include: disposing a first transparent substrate having an incident surface and a transmission surface; disposing a first parallax barrier on the first transparent substrate, the first parallax barrier including a plurality of light-shielding units, each of which is produced by using a micro-electro-mechanical system switch and includes a light-shielding body and an attraction cantilever connected with the light-shielding body; controlling attraction and separation of the attraction cantilever to move the light-shielding body, so as to allow a first type of light in the light source to be converged to a first assemblage point, and allow a second type of light in the light source to be converged to a second assemblage point.

In the above method for guiding transmission of light in the light source, the attraction cantilever may include a first electrostatic attraction cantilever which may include a first cantilever, a first cathode and a first node, and the controlling attraction and separation of the attraction cantilever to move the light-shielding body may include: applying a voltage to the first cathode and the first anode to allow the first cantilever to attract; turning off the voltage of the first cathode and the first anode to allow the first cantilever to separate.

In the above method for guiding transmission of light in the light source, the first parallax barrier may be located on the incident surface of the first transparent substrate, and the method further may include: disposing a second parallax barrier on the transmission surface of the first transparent substrate, the second parallax barrier including a plurality of stationary light-shielding units.

The above method for guiding transmission of light in the light source may further include: disposing a second transparent substrate in parallel with the first transparent substrate; disposing a third parallax barrier including a plurality of light-shielding units on the second transparent substrate, so as to, in cooperation with the first parallax barrier, allow the first type of light in the light source to be converged to the first assemblage point and allow the second type of light in the light source to be converged to the second assemblage point.

In the above method for guiding transmission of light in the light source, the controlling attraction and separation of the attraction cantilever to move the light-shielding body may include: controlling the attraction cantilever according to at least one of a feature of incoming light, a position of the first assemblage point and a position of the second assemblage point, so as to move the light-shielding body.

BRIEF DESCRIPTION OF THE DRAWINGS

In order to more clearly explain the technical solutions of the embodiments of the present application, the Figures, which are needed in the description of the embodiments or the prior art, will be briefly introduced as follows, and it is obvious that those embodiments illustrated in the Figures described below are only a part of embodiments of the present application, and for those skilled in the art, other Figures can also be obtained without creative effort according to those Figures.

DETAILED DESCRIPTION

The technical solutions of the embodiments of the present disclosure will be clearly and fully described below in connection with the accompanying figures of the present embodiments. It is obvious that the described embodiments are only a part of the embodiments of the present disclosure, but not all embodiments. Constituent units or components in each figure are only illustrative. For clarity, some of the constituent units or components may be enlarged or reduced.

In the present application, when it is described that a particular component is located between a first component and a second component, there may be either an intervening component between the particular component and the first component or the second component, or no intervening component; when it is described that a particular component is connected with other components, the particular component may be either connected with other components directly while there is no intervening component, or not connected with other components directly while there is an intervening component.

Figure 1:
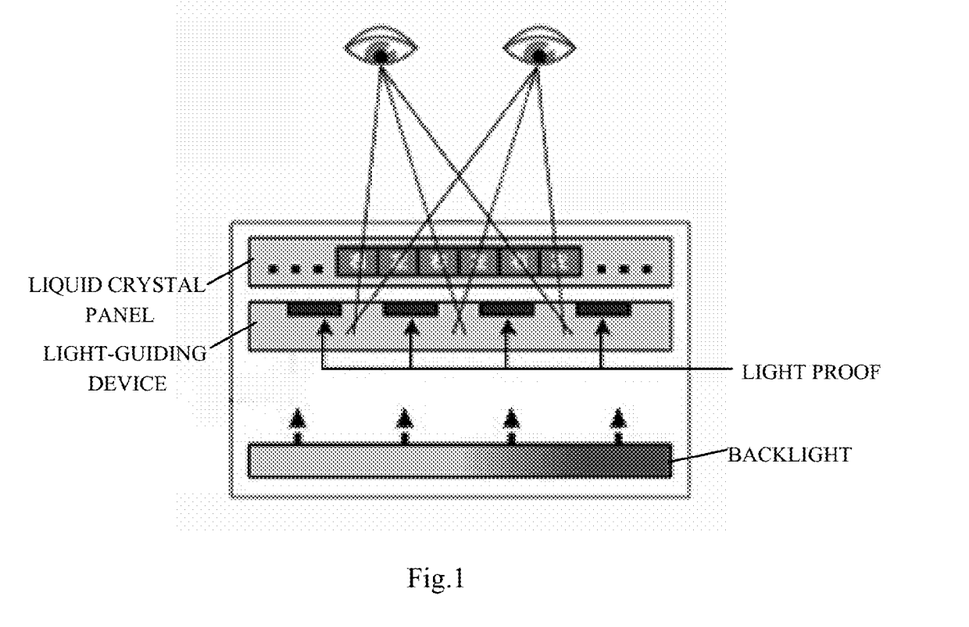
FIG. 1 schematically illustrates an application of the light-guiding device in the image display.

FIG. 1 schematically illustrates an application of the light-guiding device in the image display. As illustrated in FIG. 1, with respect to a traditional technology including a backlight unit and a liquid crystal panel, the light-guiding device, which is located between the backlight unit and the liquid crystal panel, is provided in the light barrier type naked-eye display technology. There is a light-shielding object for preventing the light from passing through in the light-guiding device, and the light-shielding object shields the a part of the light from the backlight light source, only allowing the light with some certain angles to pass through, so as to allow the light from a part of pixels only to be seen by the left eye, while the light from another part of pixels only to be seen by the right eye. Because of different angles by which visual lines of the left eye and the right eye pass through the light-guiding device, as long as the images to be reached to the left eye and the right eye are alternately arranged in longitudinal manner, respective images will be seen by the left eye and the right eye to generate a stereo feeling. Therefore, the light-shielding object in the light-guiding device is a parallax barrier, which controls the travelling direction of the light from the light source, allows the left eye and the right eye to receive the images of different pixels, so as to generate parallax to achieve a stereo effect.

In traditional technology, the said parallax barrier is formed by switching the liquid crystal. However, because the response speed of the liquid crystal material is relatively slow, the operation temperature is limited and the resolution is relatively low, these in turn lead to the relatively slow response speed of the image display, the limited operation temperature and the relatively low resolution. In the technical solution of the embodiment of the present application, the light-guiding device is produced by using a micro-electro-mechanical system switch. Because the micro-electro-mechanical system switch has an advantage such as small size, low power consumption, short response time, outstanding mechanical and electrical performance, ease of integration, the response speed and the resolution of the image display can be increased and the environmental impact on the image display effect can be reduced by using the micro-electro-mechanical system switch to produce the light-guide device.

Figure 2:
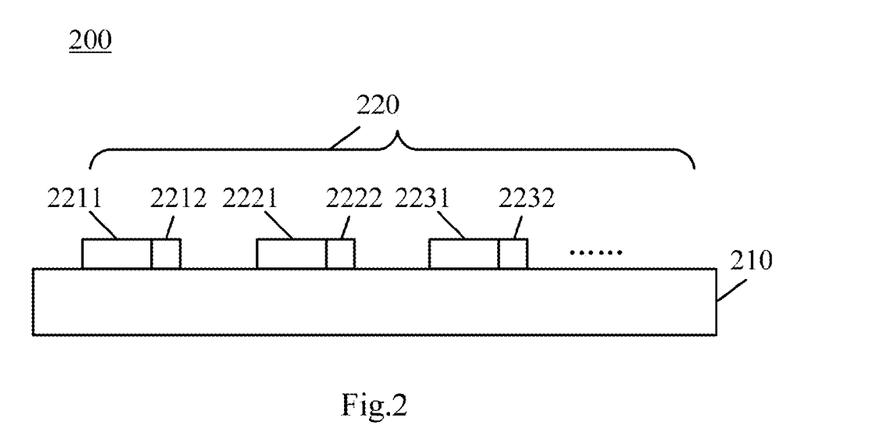
FIG. 2 schematically illustrates a block diagram of a first light-guiding device according to an embodiment of the present application.

FIG. 2 schematically illustrates a block diagram of a first light-guiding device 200 according to an embodiment of the present application. The first light-guiding device 200 is used for guiding the transmission of the light (e.g. the backlight in FIG. 1) in the light source. The light-guiding device can include: a first transparent substrate 210 having an incident surface and a transmission surface; a first parallax barrier 220 located on the first transparent substrate and configured to allow a first type of light in the light source to be converged towards a first assemblage point and allow a second type of light in the light source to be converged towards a second assemblage point. The first parallax barrier 220 can include a plurality of light-shielding units, each of which is produced by using micro-electro-mechanical system switch, and include: a light-shielding body (2211, 2221 or 2231); an attraction cantilever (2212, 2222 or 2232) connected with the light-shielding body, an attraction and a separation of the attraction cantilever being able to force the light-shielding body to move, so as to change the transmission of the light in the light source.

The first transparent substrate 210 is used for supporting the first parallax barrier 220. The light can pass through the first transparent substrate 210 freely. As an example, the first transparent substrate 210 can be produced by using a material such as glass, polycarbonate, etc. Typically, the first transparent substrate 210 can be a rectangular shape, but is not limited thereto, and it can also be, for example, an arc shape, and its specific shape can be designed according to the light transmission path from the light source to the assemblage point of the light. The first transparent substrate 210 can have the incident surface and the transmission surface, and the incident surface refers to a surface area facing the light source and the transmission surface is a surface area facing away from the light source.

The first parallax barrier 220 is located on the first transparent substrate, and for example, it can be located on the incident surface of the first transparent substrate 210, and can also be located on the transmission surface of the first transparent substrate 210. The first parallax barrier 220 uses the light-shielding unit therein to allow the first type of light in the light source to be converged to the first assemblage point and allow the second type of light in the light source to be converged to the second assemblage point. The first assemblage point and the second assemblage point are, for example, the left eye and the right eye in the FIG. 1, respectively, and they can also be any other assemblage point to which the light needs to be converged. It should be noted that the first assemblage point and the second assemblage point herein are only typical applications, and if needed, the light from the light source can be converged to one assemblage point or be converged to three assemblage points, or more assemblage points. The position of each assemblage point can be designed as needed. Therefore, the number and the position of the assemblage points do not pose any limitation to the embodiment of the present disclosure.

The first parallax barrier 220 can include a plurality of light-shielding units, each of which is produced by using the micro-electro-mechanical system switch. In FIG. 2, three light-shielding units are illustrated, that is, a first light-shielding unit including a light-shielding body 2211 and an attraction cantilever 2212, a second light-shielding unit including a light-shielding body 2221 and an attraction cantilever 2222, and a third light-shielding unit including a light-shielding body 2231 and an attraction cantilever 2232, and these are only exemplary. The number of the light-shielding units can be changed according to at least one of the size of the display panel, the number of pixels of the display image, the resolution of the image, etc. Because the micro-electro-mechanical system switch has an advantage such as small size, low power consumption, short response time, outstanding mechanical and electrical performance, ease of integration, the response speed and the resolution of the image display can be increased and the environmental impact on the image display effect can be reduced by using the micro-electro-mechanical system switch to produce the light-guide device in the embodiment of the present application.

Each light-shielding unit may include: the light-shielding body (2211, 2221 or 2231); an attraction cantilever (2212, 2222 or 2232) connected with the light-shielding body, the attraction and the separation of the attraction cantilever being able to force the light-shielding body to move, so as to change the transmission of the light in the light source. When the attraction and the separation of the attraction cantilever force the light-shielding body to move, a transmission path from the light of the light source to the assemblage point will be changed, and this causes the light with different components in the light source to be transmitted to the assemblage point, so as to change the image effect viewed by people's eyes and generate three-dimensional images at the left eye and the right eye.

The light-shielding body can be produced by using an opaque material, which is existent or will be present in the future, for preventing the light from passing through, and it can be produced, for example, by using a polyester material. The shape, the size and the position on the first transparent substrate of each light-shielding body may also be designed as needed, and the shapes or the sizes of respective light-shielding bodies may also be different from each other. As an example, the length of each light-shielding body is, for example, 10 μm-30 μm. The production way, the shape, the size and the like of each light-shielding body do not pose any limitation to the embodiment of the present application. Hereinafter, taking the first light-shielding unit including the light-shielding body 2211 and the attraction cantilever 2212 as an example, an example of the light-shielding unit will be described in connection with FIG. 3 and FIG. 4.

Figure 3:
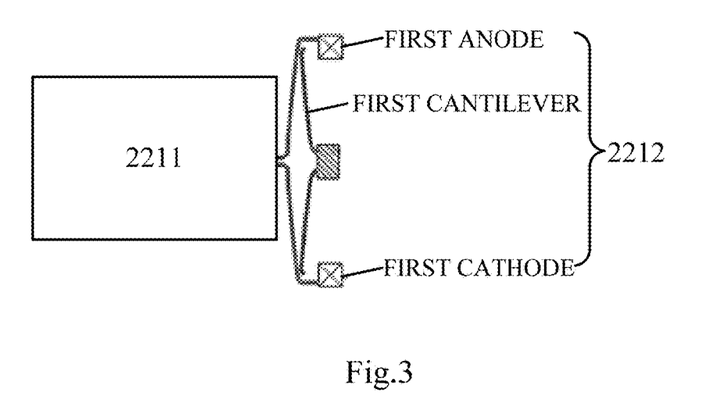
FIG. 3 schematically illustrates a first structure diagram of the light-shielding unit in the light-guiding device of FIG. 2.

FIG. 3 schematically illustrates a first structure diagram of the light-shielding unit in the light-guiding device of FIG. 2. As illustrated in FIG. 3, the light-shielding unit in the light-guiding device includes the light-shielding body 2211 and attraction cantilever 2212. The said attraction cantilever 2212 is a first electrostatic attraction cantilever which includes a first cantilever, a first cathode and a first anode. When a voltage is applied to the first cathode and the first anode, the first cantilever can attract. When no voltage is applied to the first cathode and the first anode, the first cantilever can separate.

The attraction of the first cantilever causes the light-shielding body 2211 to move towards the right side direction of FIG. 3, and the separation of the first cantilever causes the light-shielding body 2211 to move towards the left side direction of FIG. 3. Typically, the magnitude of the voltage applied to the first cathode and the first anode can be controlled, so as to control the attraction degree of the first cantilever, so that the amount of movement of the light-shielding body 2211 can be controlled more precisely.

Therefore, driven by the attraction cantilever 2211, the light-shielding body 2211 moves so as to change the transmission path from the light of the light source to the assemblage point, and this causes the light with different components in the light source to be transmitted to the assemblage point so as to change the image effect viewed by people's eyes. It should be noted that the first electrostatic attraction cantilever illustrated in FIG. 3 is only illustrative, and attraction cantilevers with any other structure form can be realized by using the micro-electro-mechanical system switch as long as the attraction cantilevers can control the movement of the light-shielding body.

Figure 4:
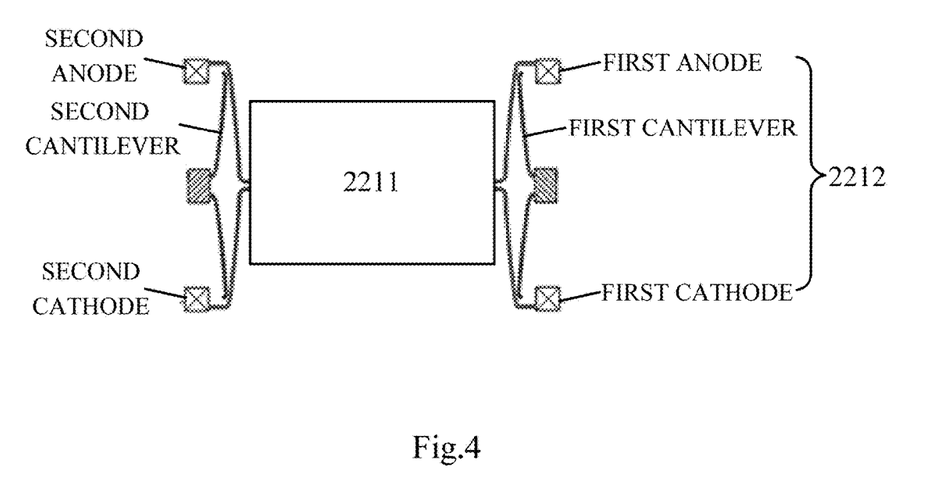
FIG. 4 schematically illustrates a second structure diagram of the light-shielding unit in the light-guiding device of FIG. 2.

FIG. 4 schematically illustrates a second structure diagram of the light-shielding unit in the light-guiding device of FIG. 2. The light-shielding body 2211 and the attraction cantilever 2212 in FIG. 4 is the same as those in FIG. 3. Comparing with FIG. 3, a second electrostatic attraction cantilever is added at a side facing the attraction cantilever 2212 of the light-shielding body 2211 in FIG. 4. The second electrostatic attraction cantilever includes a second cantilever, a second cathode and a second anode. The second electrostatic attraction cantilever and the first electrostatic attraction cantilever are respectively located at two opposite sides connected to the light-shielding body.

Similar to the first electrostatic attraction cantilever, when a voltage is applied to the second cathode and the second anode, the second cantilever can attract. When no voltage is applied to the second cathode and the second anode, the second cantilever can separate. The attraction of the second cantilever causes the light-shielding body 2211 to move towards the left side direction of FIG. 3. Typically, the magnitude of the voltage applied to the second cathode and the second anode can be controlled, so as to adjust the attraction degree of the second cantilever, so that the amount of movement of the light-shielding body 2211 can be controlled more precisely. The added second electrostatic attraction cantilever makes the light-shielding body more stable, and can increase a flexibility of the amount of movement.

The position of the plurality of light-shielding units and the movement of each light-shielding body in the said first parallax barrier 220 can be determined according to at least one of a feature of incoming light, a position of the first assemblage point and a position of the second assemblage point. As an example, a first transmission path from the light of the light source to the first assemblage point and a second transmission path from the light of the light source to the second assemblage point are determined according to the positions of the first assemblage point, the second assemblage point and the light source; a signal component of the light in the first transmission path and the second transmission path are determined according to the content of the image to be displayed; the position of the light-shielding body in each light-shielding unit is controlled according to the determined signal component of the light in the first transmission path and the second transmission path, so as to control the attraction cantilever corresponding to each light-shielding body to make adjustment. The movement control manner of each light-shielding unit does not pose any limitation to the embodiment of the present application.

Figure 5:
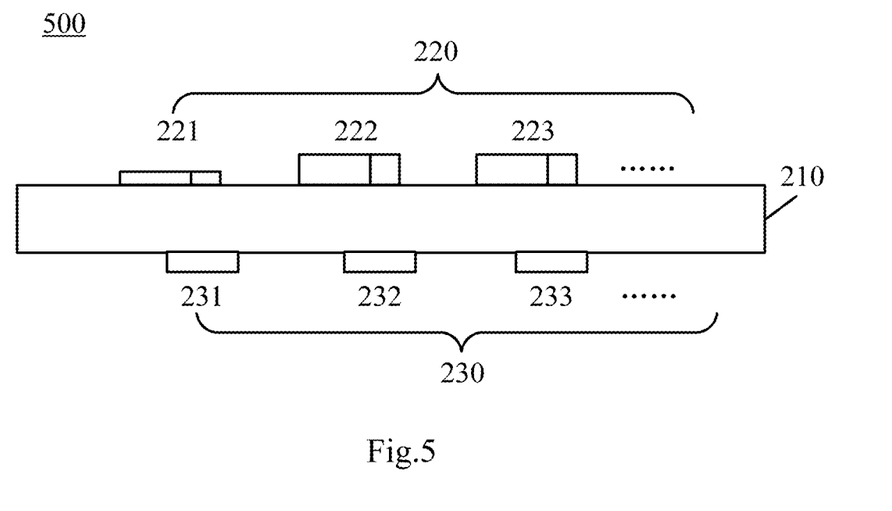
FIG. 5 schematically illustrates a block diagram of a second light-guiding device 500 according to an embodiment of the present application.

FIG. 5 schematically illustrates a block diagram of a second light-guiding device 500 according to an embodiment of the present application. A first transparent substrate 210 and a first parallax barrier 220 in the second light-guiding device 500 are the same as those counterparts in the first light-guiding device 200. Comparing with the first light-guiding device 200, the second light-guiding device 500 further includes a second parallax barrier 230. The second parallax barrier 230 and the first parallax barrier 220 are separately located at two opposite sides of the first transparent substrate, for example, the first parallax barrier 220 is located on the incident surface of the first transparent substrate 210, and the second parallax barrier 230 is located on the transmission surface of the first transparent substrate 210. The second parallax barrier includes a plurality of light-shielding units, and is configured, in cooperation with the first parallax barrier, to allow the first type of light in the light source to be converged towards a first direction and allow the second type of light in the light source to be converged towards to a second direction.

As illustrated in FIG. 5, the plurality of light-shielding units in the second parallax barrier 230 can be fixedly disposed on the transmission surface of the first transparent substrate. Typically, each light-shielding unit in the second parallax barrier 230 only includes the light-shielding body and does not include the attraction cantilever. The light path adjustment by the light-guiding device is only carried out through the movement of the light-shielding body in the first parallax barrier 220. At this point, the control by the light-guiding device is relatively simple, but the flexibility of the light transmission path adjustment by the light-guiding device is low.

Alternatively, the light-shielding unit of the second parallax barrier 230 in FIG. 5 can be moved on the transmission surface of the first transparent substrate, and the light-shielding unit of the second parallax barrier 230 can apply a structure similar to that of the light-shielding unit of the first parallax barrier 220, for example, it can apply the structure illustrated in FIG. 3, i.e., including: the light-shielding body; the attraction cantilever connected with the light-shielding body, the attraction and the separation of the attraction cantilever being able to force the light-shielding body to move, so as to change the transmission of the light. The light-shielding unit of the second parallax barrier 230 can also apply the structure illustrated in FIG. 4.

Figure 6:
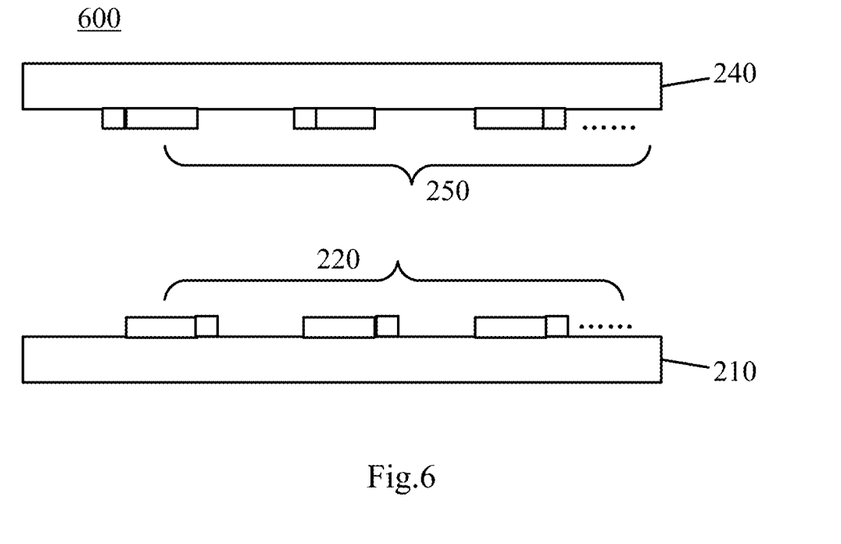
FIG. 6 schematically illustrates a block diagram of a third light-guiding device 600 according to an embodiment of the present application.

FIG. 6 schematically illustrates a block diagram of a third light-guiding device 600 according to an embodiment of the present application. A first transparent substrate 210 and a first parallax barrier 220 in the third light-guiding device 600 are the same as those counterparts in the first light-guiding device 200. Comparing with the first light-guiding device 200, the third light-guiding device 600 further includes a second transparent substrate 240; a third parallax barrier 250 located on the second transparent substrate 240 and configured, in cooperation with the first parallax barrier, to allow a first type of light in the light source to be converged towards a first direction and allow a second type of light in the light source to be converged towards to a second direction, and the third parallax barrier 250 includes a plurality of light-shielding units.

The second transparent substrate 240 can be designed or produced according to a manner similar to that of the first transparent substrate 230. The structure of each light-shielding unit in the third parallax barrier 250 can be the structure as illustrated in FIG. 3 or FIG. 4, and each light-shielding unit can be disposed independently, so as to control the light-shielding body in each light-shielding unit independently. Alternatively, each light-shielding unit in the third parallax barrier 250 can be the same as that in the second parallax barrier 230 in FIG. 5, and can be fixedly disposed on the second transparent substrate 240.

In the technical solution of the light-guiding device (200, 500 or 600) for guiding light transmission according to the embodiment of the present application, the parallax barrier is produced by using the micro-electro-mechanical system switch, the advantage of the micro-electro-mechanical system switch, such as small size, short response time, outstanding mechanical and electrical performance, ease of integration, has been brought into full play, the response speed and the resolution of the image display can be increased and the environmental impact on the image display effect can be reduced.

Figure 7:
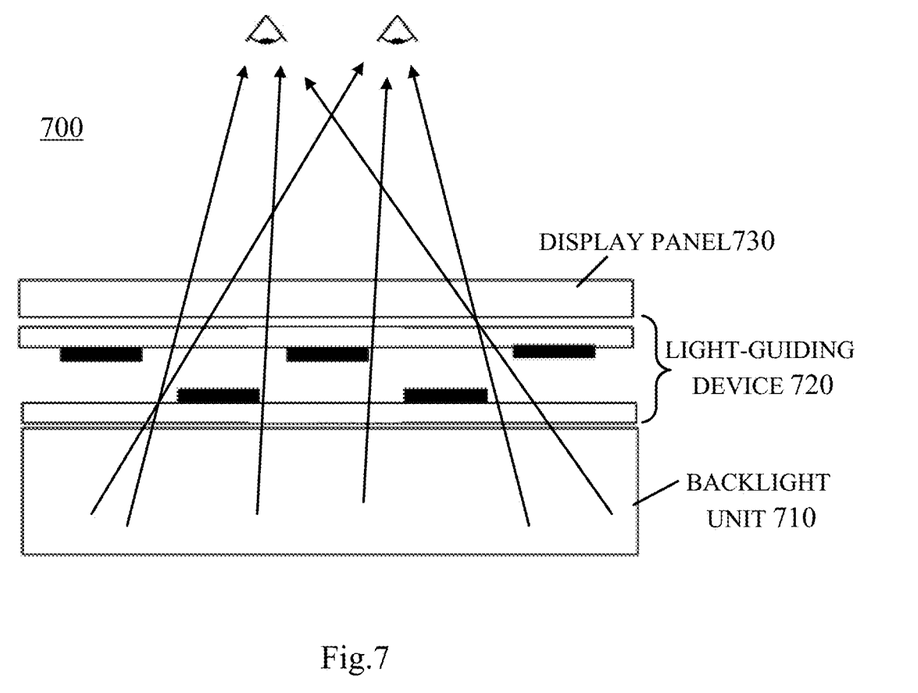
FIG. 7 schematically illustrates a block diagram of a display apparatus including a light-guiding device according to an embodiment of the present application.

FIG. 7 schematically illustrates a block diagram of a display apparatus 700 including a light-guiding device according to an embodiment of the present application. As illustrated in FIG. 7, the display apparatus 700 may include: a backlight unit 710 for providing a light source needed for image display; a display panel 730 for displaying image by using light of the light source according to image data; a light-guiding device 720 located between the backlight unit and the display panel.

The backlight unit 710 has the light source that can emit light which is then transmitted through or reflected by the display panel to form an image. Typically, the backlight unit 710 can provide the light source with sufficient brightness and uniform distribution so that it can display the image properly. For example, the backlight unit 710 can include the light source, a light guide panel, a reflection film and an optical diaphragm. The backlight unit 710 can be realized by using any technology that is existent or will be present in the future, and its specific structure and realization do not pose any limitation to the embodiment of the present application.

Typically, the display panel 730 is liquid crystal panel. When the light emitted from the backlight unit 710 irradiates the liquid crystal panel, light beam will be first delivered upwardly through a lower polarizer, and different liquid crystal panels will change polarization directions of the light beam according to its own mechanism. Then, the light beam touches a color filter to generate a color, and finally is incident on an upper polarizer. After the polarization direction of the liquid crystal is changed, a part of the light can be emitted and a part of the light can be absorbed. Each pixel on the whole liquid crystal panel can separately determine the strength of the emitted light so as to generate an image. The liquid crystal panel is only an example, and any panel that can use the light source of the backlight unit to generate an image can be used as the display panel.

The light-guiding device 720 can use any light-guiding device that is above described in connection with FIGS. 2-6, and the light-guiding device uses the micro-electro-mechanical system switch so produce the parallax barrier. Therefore, for the specific structure about the light-guiding device 720, reference can be made to the above description in connection with FIGS. 2-6.

As illustrated in FIG. 7, after the light from the backlight unit is shielded or guided by the light-guiding device, a part of the light is converged to the left eye, and a part of the light is converged to the right eye, so that people can view the image with stereo feeling.

In the technical solution of the display apparatus according to the embodiment of the present application, the parallax barrier is produced by using the micro-electro-mechanical system switch, and the response speed and the resolution of the image display can be increased and the environmental impact on the image display effect can be reduced.

Figure 8:
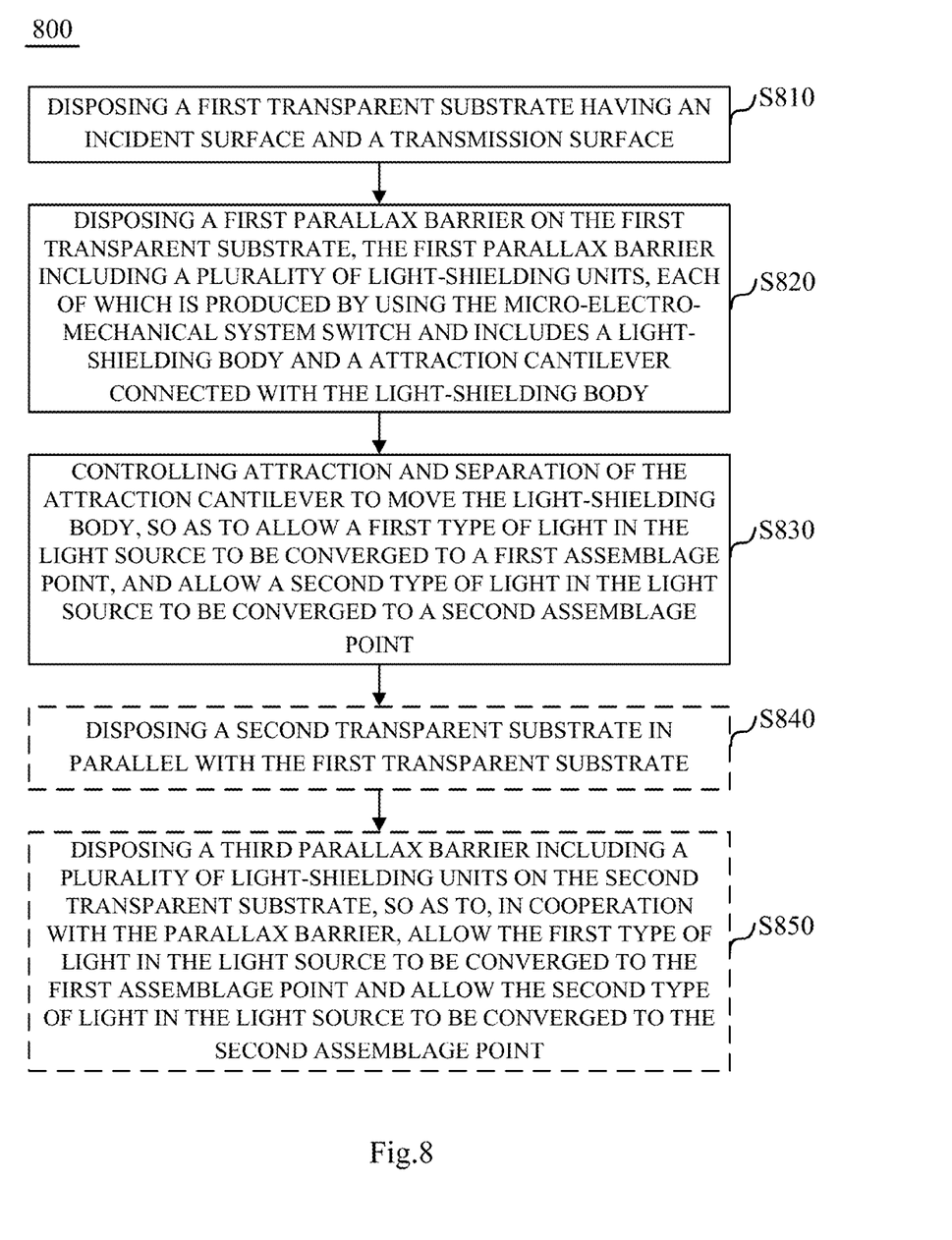
FIG. 8 schematically illustrates a flowchart of a method for guiding transmission of light in a light source according to an embodiment of the present application.

FIG. 8 schematically illustrates a flowchart of a method 800 for guiding transmission of light in a light source according to an embodiment of the present application. The method 800 for guiding transmission of light in the light source is applied to an image display.

As illustrated in FIG. 8, the method 800 for guiding transmission of light in the light source can include: disposing a first transparent substrate having an incident surface and a transmission surface (S810); disposing a first parallax barrier on the first transparent substrate, the first parallax barrier including a plurality of light-shielding units, each of which is produced by using the micro-electro-mechanical system switch and includes a light-shielding body and an attraction cantilever connected with the light-shielding body (S820); controlling attraction and separation of the attraction cantilever to move the light-shielding body, so as to allow a first type of light in the light source to be converged to a first assemblage point, and allow a second type of light in the light source to be converged to a second assemblage point (S830).

The first transparent substrate disposed in S810 is used for supporting the first parallax barrier. The light beam can pass through the first transparent substrate freely. As an example, the first transparent substrate can be produced by using a material such as glass, polycarbonate, etc. Typically, the first transparent substrate 210 can be a rectangular shape, and its specific shape can be designed according to the light transmission path from the light source to the assemblage point of the light. The first transparent substrate can have the incident surface and the transmission surface, and the incident surface refers to a surface area facing the light source and the transmission surface is a surface area facing away from the light source.

The first parallax barrier disposed in S820 is located on the first transparent substrate. The first parallax barrier can include a plurality of light-shielding units, each of which is produced by using the micro-electro-mechanical system switch. The number of the light-shielding units can be changed according to at least one of the size of the display panel, the number of pixels of the display image, the resolution of the image, etc. Each light-shielding unit can include: the light-shielding body; the attraction cantilever connected with the light-shielding body. The light-shielding body can be produced by using an opaque material, which is existent or will be present in the future, for preventing the light from passing through, and it can be produced, for example, by using a polyester material. The shape, the size and the position on the first transparent substrate of each light-shielding body may also be designed as needed, and the shapes or the sizes of respective light-shielding bodies may also be different from each other. That is so say, the production way, the shape, the size and the like of each light-shielding body do not pose any limitation to the embodiment of the present application.

For the structure about the light-shielding unit, reference can be made to the above description in connection with FIGS. 3-4. Typically, the attraction cantilever can include a first electrostatic attraction cantilever which includes a first cantilever, a first cathode and a first node; in addition to the first electrostatic attraction cantilever, the attraction cantilever can also include a second electrostatic attraction cantilever which includes a second cantilever, a second cathode and a second anode.

In S830, the attraction and the separation of the attraction cantilever are controlled to move the light-shielding body, so as to allow the first type of light in the light source to be converged to the first assemblage point, and allow the second type of light in the light source to be converged to the second assemblage point. The attraction and the separation of the attraction cantilever in the light-shielding unit are able to force the light-shielding body to move, so as to change the transmission of the light in the light source. When the attraction and the separation of the attraction cantilever force the light-shielding body to move, the transmission path from the light in the light source to the assemblage point will be changed, and this causes the light with different components in the light source to be transmitted to the assemblage point so as to change the image effect viewed by people's eyes, and further generate three-dimensional images at the left eye and the right eye.

The first assemblage point and the second assemblage point are, for example, the left eye and the right eye in the FIG. 1, respectively, and they can also be any other assemblage point to which the light needs to be converged. It should be noted that the first assemblage point and the second assemblage point herein are only typical applications, and if needed, the light from the light source can be converged to one assemblage point or be converged to three assemblage points, or more assemblage points. The position of each assemblage point can be designed as needed. Therefore, the number and the position of the assemblage points do not pose any limitation to the embodiment of the present disclosure.

In the case of the attraction cantilever includes the first electrostatic attraction cantilever, the controlling attraction and separation of the attraction cantilever to move the light-shielding body can include: applying a voltage to the first cathode and the first anode to allow the first cantilever to attract; turning off the voltage of the first cathode and the first anode to allow the first cantilever to separate.

The control in S830 can be realized as follows: determining a first transmission path from the light of the light source to the first assemblage point and a second transmission path from the light of the light source to the second assemblage point according to the positions of the first assemblage point, the second assemblage point and the light source; determining a signal component of the light in the first transmission path and the second transmission path according to the content of the image to be displayed; controlling the position of the light-shielding body in each light-shielding unit according to the determined signal component of the light in the first transmission path and the second transmission path, so as to control the attraction cantilever corresponding to each light-shielding body to make adjustment. That is to say, in S830, the attraction cantilever can be controlled according to at least one of a feature of incoming light, a position of the first assemblage point and a position of the second assemblage point, so as to move the light-shielding body.

The parallax barriers can be separately disposed on the incident surface and the transmission surface of the first transparent substrate, so as to increase accuracy and flexibility of light path control. For example, when the first parallax barrier is located on the incident surface of the first transparent substrate, the method 800 for guiding transmission of the light in the light source can also include disposing a second parallax barrier on the transmission surface of the first transparent substrate. The second parallax barrier, in cooperation with the first parallax barrier, allows the first type of light in the light source to be converged to the first direction, and allows the second type of light in the light source to be converged to the second direction, and the second parallax barrier includes a plurality of light-shielding units. The plurality of light-shielding units of the second parallax barrier can be stationary. Alternatively, each light-shielding unit of the second parallax barrier can also include: the light-shielding body; the attraction cantilever connected to the light-shielding body. That is to say, the light-shielding unit of the second parallax barrier is configured similar to the first parallax barrier, and the light-shielding unit of the second parallax barrier can have, for example, the structure illustrated in FIG. 3, or the structure illustrated in FIG. 4.

Different parallax barriers can be disposed on two different transparent substrates, instead of disposing different parallax barriers on the first transparent substrate. For example, besides including S810, S820 and S830, the method 800 for guiding the light transmission further includes: as illustrated in dotted blocks of FIG. 8, disposing a second transparent substrate in parallel with the first transparent substrate (S840); disposing a third parallax barrier including a plurality of light-shielding units on the second transparent substrate, so as to, in cooperation with the parallax barrier, allow the first type of light in the light source to be converged to the first assemblage point and allow the second type of light in the light source to be converged to the second assemblage point (S850).

The second transparent substrate in S840 can be designed or produced according to a manner similar to that of the first transparent substrate. The structure of each light-shielding unit in the third parallax barrier disposed in S850 can be the structure as illustrated in FIG. 3 or FIG. 4, and each light-shielding unit can be disposed independently, so as to control the light-shielding body in each light-shielding unit independently. Alternatively, each light-shielding unit in the third parallax barrier can be fixedly disposed on the second transparent substrate.

In the technical solution of the method for guiding the light transmission according to the embodiment of the present application, the parallax barrier is produced by using the micro-electro-mechanical system switch, and the response speed and the resolution of the image display can be increased and the environmental impact on the image display effect can be reduced.

Those skilled in the art may clearly understand that, for convenience and conciseness of description, for the light-guiding device formed by the above-described method for guiding the light transmission, reference can be made to the Figures and the operations in the above-described device embodiments, and the description will not be described herein.

It should be appreciated that in the embodiments provided by the present application, the disclosed device and method can be realized by other manners. For example, the above-described device embodiments are only illustrative, and a part of steps in the above method embodiments can be re-combined.

The above description is only a specific implement of the present disclosure, but the protection scope of the present disclosure is not limited thereto, and variations and alternations in the technical scope disclosed by the present disclosure, which may easily occur to any skilled who is familiar with the present technical field, should be within the protection scope of the present disclosure. Therefore, for the protection scope of the present disclosure, the protection scope of appended claims shall prevail.

The invention claimed is:

1. A light-guiding device for guiding transmission of light in a light source, comprising:
 a first transparent substrate having an incident surface and a transmission surface;
 a first parallax barrier located on the first transparent substrate and configured to allow a first type of light in the light source to be converged to a first assemblage point and allow a second type of light in the light source to be converged to a second assemblage point, wherein the first parallax barrier comprises a plurality of light-shielding units, each of which is produced by using a micro-electro-mechanical system switch, and comprises:

a light-shielding body;

an attraction cantilever connected with the light-shielding body, an attraction and a separation of the attraction cantilever being capable of forcing the light-shielding body to move so as to change transmission of the light in the light source.

2. The light-guiding device according to claim 1, wherein the attraction cantilever comprises: a first electrostatic attraction cantilever, comprising a first cantilever, a first cathode and a first anode and wherein when a voltage is applied to the first cathode and the first anode, the first cantilever attracts, and when no voltage is applied to the first cathode and the first anode, the first cantilever separates.

3. The light-guiding device according to claim 2, wherein the attraction cantilever further comprises a second electrostatic attraction cantilever comprising a second cantilever, a second cathode and a second anode and wherein the first electrostatic attraction cantilever and the second electrostatic attraction cantilever are respectively located at two opposite sides connected to the light-shielding body.

4. The light-guiding device according to claim 1, wherein the first parallax barrier is located on the incident surface of the first transparent substrate, and the light-guiding device further comprises:

a second parallax barrier located on the incident surface of the first transparent substrate and configured, in cooperation with the first parallax barrier, to allow the first type of light in the light source to be converged towards a first direction and allow the second type of light in the light source to be converged towards a second direction, the second parallax barrier comprising a plurality of light-shielding units.

5. The light-shielding device according to claim 1, wherein the plurality of light-shielding units in the second parallax barrier are fixedly disposed on the transmission surface of the first transparent substrate.

6. The light-guiding device according to claim 4, wherein each light-shielding unit in the second parallax barrier comprises:

a light-shielding body; and, an attraction cantilever connected with the light-shielding body, an attraction and a separation of the attraction cantilever being capable of forcing the light-shielding body to move so as to change light transmission.

7. The light-guiding device according to claim 1, further comprising:

a second transparent substrate; and, a third parallax barrier located on the second transparent substrate and configured, in cooperation with the first parallax barrier, to allow the first type of light in the light source to be converged towards a first direction and allow the second type of light in the light source to be converged towards a second direction, and the third parallax barrier comprising a plurality of light-shielding units.

8. The light-guiding device according to claim 1, wherein a position of the plurality of light-shielding units and a movement of each light-shielding body in the first parallax barrier are determined according to at least one of a feature of incoming light, a position of the first assemblage point and a position of the second assemblage point.

9. A display apparatus for displaying image, comprising:

a backlight unit for providing a light source needed for image display;

a display panel for displaying image by using light of the light source according to image data; and a light-guiding device located between the backlight unit and the display panel;

a first transparent substrate having an incident surface and a transmission surface;

a first parallax barrier located on the first transparent substrate and configured to allow a first type of light in the light source to be converged to a first assemblage point and allow a second type of light in the light source to be converged to a second assemblage point, wherein the first parallax barrier comprises a plurality of light-shielding units, each of which is produced by using a micro-electro-mechanical system switch, and comprises:

a light-shielding body;

an attraction cantilever connected with the light-shielding body, an attraction and a separation of the attraction cantilever being capable of forcing the light-shielding body to move so as to change transmission of the light in the light source.

10. The display apparatus according to claim 9, wherein the attraction cantilever comprises a first electrostatic attraction cantilever comprising a first cantilever, a first cathode and a first anode, and when a voltage is applied to the first cathode and the first anode, the first cantilever attracts, and when no voltage is applied to the first cathode and the first anode, the first cantilever separates.

11. The display apparatus according to claim 10, wherein the attraction cantilever further comprises a second electrostatic attraction cantilever comprising a second cantilever, a second cathode and a second anode, wherein the first electrostatic attraction cantilever and the second electrostatic attraction cantilever are respectively located at two opposite sides connected to the light-shielding body.

12. The display apparatus according to claim 9, wherein the first parallax barrier is located on the incident surface of the first transparent substrate, and the light-guiding device further comprises a second parallax barrier located on the incident surface of the first transparent substrate and configured, in cooperation with the first parallax barrier, to allow the first type of light in the light source to be converged towards a first direction and allow the second type of light in the light source to be converged towards a second direction, the second parallax barrier comprising a plurality of light-shielding units.

13. A method for guiding transmission of light in a light source, comprising:

disposing a first transparent substrate having an incident surface and a transmission surface;

disposing a first parallax barrier on the first transparent substrate, the first parallax barrier comprising a plurality of light-shielding units, each of which is produced by using a micro-electro-mechanical system switch and comprises a light-shielding body and an attraction cantilever connected with the light-shielding body; and, controlling attraction and separation of the attraction cantilever to move the light-shielding body, so as to control a first type of light in the light source to be converged to a first assemblage point, and control a second type of light in the light source to be converged to a second assemblage point.

14. The method according to claim 13, wherein the attraction cantilever comprises a first electrostatic attraction cantilever with a first cantilever, a first cathode and a first node, said controlling attraction and separation of the attraction cantilever comprises:
   applying a voltage to the first cathode and the first anode to allow the first cantilever to attract; and
   turning off the voltage of the first cathode and the first anode to allow the first cantilever to separate.

15. The method according to claim 13, wherein the first parallax barrier is located on the incident surface of the first transparent substrate and the method further comprises disposing a second parallax barrier on the transmission surface of the first transparent substrate, the second parallax barrier comprising a plurality of stationary light-shielding units.

16. The method according to claim 13, further comprising:
   disposing a second transparent substrate in parallel with the first transparent substrate; and
   disposing a third parallax barrier comprising a plurality of light-shielding units on the second transparent substrate, so as to, in cooperation with the first parallax barrier, allow the first type of light in the light source to be converged to the first assemblage point and allow the second type of light in the light source to be converged to the second assemblage point.

17. The method according to claim 13, wherein, the controlling attraction and separation of the attraction cantilever to move the light-shielding body comprises controlling the attraction cantilever according to at least one of a feature of incoming light, a position of the first assemblage point and a position of the second assemblage point, so as to move the light-shielding body.

* * * * *